United States Patent [19]

Miller et al.

[11] 4,340,465
[45] Jul. 20, 1982

[54] DUAL COMPONENT CRYSTALLINE SILICATE CRACKING CATALYST

[75] Inventors: Stephen J. Miller, San Francisco; Keith C. Bishop, III, San Rafael, both of Calif.

[73] Assignee: Chevron Research Company, San Francisco, Calif.

[21] Appl. No.: 191,575

[22] Filed: Sep. 29, 1980

[51] Int. Cl.$^3$ ............................................. C10G 11/05
[52] U.S. Cl. ................................ 208/120; 252/455 Z
[58] Field of Search ......................................... 208/120

[56] References Cited

U.S. PATENT DOCUMENTS

| | | | |
|---|---|---|---|
| 3,758,403 | 9/1973 | Rosinski et al. | 208/120 |
| 3,847,793 | 11/1974 | Schwartz et al. | 208/70 |
| 3,890,218 | 6/1975 | Morrison | 208/135 |
| 3,894,933 | 7/1975 | Owen et al. | 208/77 |
| 3,894,934 | 7/1975 | Owen et al. | 208/78 |
| 3,925,195 | 12/1975 | Scherzer et al. | 208/120 |
| 3,941,871 | 3/1976 | Dwyer et al. | 208/110 |
| 4,061,724 | 12/1977 | Grose et al. | 423/335 |
| 4,073,865 | 2/1978 | Flanigen et al. | 423/339 |
| 4,239,654 | 12/1980 | Gladrow et al. | 208/120 X |
| 4,287,048 | 9/1981 | Gladrow et al. | 208/120 |
| 4,309,279 | 1/1982 | Chester et al. | 208/120 |
| 4,309,280 | 1/1982 | Rosinski et al. | 208/120 |

OTHER PUBLICATIONS

Flanigen et al., "Silicalite, A New Hydrophobic Crystalline Silica Molecular Sieve," Nature 271, 512–516 (Feb. 9, 1978).
Bibby et al., "Silicalite-2, A Silica Analog of the Aluminosilicate Zeolite ZSM14 11," Nature 280, 664–665 (Aug. 23, 1979).
Anderson et al., "Reactions on ZSM-5-Type Zeolite Catalysts," J. Catalysis 58, 114–130 (1979).

*Primary Examiner*—Delbert E. Gantz
*Assistant Examiner*—G. E. Schmitkons
*Attorney, Agent, or Firm*—D. A. Newell; W. H. Hooper; S. H. Roth

[57] ABSTRACT

A process for catalytically cracking a hydrocarbonaceous feedstock employing a dual component catalyst. The process is conducted under catalytic cracking conditions, preferably in a single stage, in the absence of added hydrogen. The dual component catalyst composition comprises an essentially alumina-free crystalline silicate component and a large pore size crystalline alumino-silicate cracking component.

20 Claims, No Drawings

DUAL COMPONENT CRYSTALLINE SILICATE CRACKING CATALYST

BACKGROUND OF THE INVENTION

1. Field of the Invention

The present invention relates to hydrocarbon processing in general and, more particularly, to catalytic cracking of hydrocarbonaceous feedstocks. Specifically, the present invention relates to a process for catalytically cracking a hydrocarbonaceous feedstock with a catalyst composition comprising an essentially alumina-free crystalline silicate component and a large pore size crystalline aluminosilicate cracking component.

2. Brief Description of the Prior Art

Catalytic cracking systems typically employ a fluidized bed or a moving bed of a finely divided particulate catalyst. This cracking catalyst is subjected to continuous cycling between a cracking reaction and a catalyst regeneration system. In a fluidized catalytic cracking (FCC) system, a stream of a hydrocarbonaceous feedstock is generally contacted with fluidized catalyst particles in a reaction zone, usually at a temperature of from about 425° C.–650° C., or higher. The cracking of the hydrocarbon in the feed generally results in deposition of carbonaceous coke on the catalyst particles and, of course, in the production of lower-molecular-weight hydrocarbons. The hydrocarbons are separated from the catalyst which is stripped of volatiles and passed to the catalyst regenerator where it is contacted with an oxygen-containing gas to burn off the coke. The heat evolved during this coke burnoff heats the catalyst particles and supplies the sensible heat for the cracking reaction. The thus regenerated catalyst is returned to the reaction zone for contacting additional feedstock.

Zeolitic materials, both natural and synthetic, are known to have catalytic activity in various types of hydrocarbon conversion reactions including catalytic cracking. Molecular sieve crystalline zeolites are aluminosilicates comprised of a rigid 3-dimensional framework of $SiO_4$ and $AlO_4$ tetrahedra joined by common oxygen atoms. The inclusion of aluminum atoms in the framework produces a deficiency in electrical charge which must be locally neutralized by the presence of additional positive ions within the structural framework. In natural zeolites, and many of the synthetic zeolites, these ions are normally alkali metal or alkaline earth metal cations which are quite mobile and readily exchanged. The cations occupy channels and interconnected voids provided by the framework geometry. U.S. Pat. No. 3,758,403, to Rosinski et al., the disclosure of which is incorporated by reference herein, describes the ZSM-5-type zeolitic aluminosilicate catalysts and their preparation in detail.

The present invention relates in part to crystalline silicate catalyst components which are essentially alumina free. Crystalline silicates have been prepared and reported in the literature. For example, U.S. Pat. No. 4,073,865 to Flanigen et al., incorporated by reference herein, discloses various crystalline silica polymorphs and methods for their preparation. U.S. Pat. No. 4,061,724 to Grose et al., incorporated by reference herein, discloses a crystalline silica polymorph called "silicalite" and a method for its preparation. U.S. Pat. No. Re. 29,948, to Dwyer et al., incorporated by reference herein, discloses a crystalline silicate essentially free of Group IIIA metals, a method for its preparation and processes employing the same.

Flanigen et al, Nature, 271, 512–516 (Feb. 9, 1978) discuss the physical and adsorption characteristics of silicalite. Bibby et al., Nature, 280, 664–665 (Aug. 23, 1979) report the preparation of a crystalline silicate denominated "silicalite-2". Finally, Anderson et al., J. Catalysis, 58 114–130 (1979) discuss catalytic reactions and sorption measurements carried out on ZSM-5 and silicalite.

In addition to an essentially alumina-free catalyst component, the catalyst of the present invention also employs a large pore size crystalline aluminosilicate cracking component. Such components are well known. Briefly, a crystalline aluminosilicate cracking component has a uniform pore dimension and a pore size from about 7 to 15 Angstroms. These large pore size cracking components admit both normal and iso-aliphatics and have the capability of acting with respect to substantially all the components of a gas oil feed. Zeolites, including the synthetic faujasites, known as zeolite X and zeolite Y, are particularly desirable. Of course, other large pore size zeolites can be employed.

Combination catalysts have been employed to treat hydrocarbon feedstocks. U.S. Pat. No. 3,686,121 to Kimberlin, Jr., et al, discloses a hydrocarbon conversion catalyst comprising at least two crystalline alumino-silicate zeolites having essentially the same crystal structure but having different silica-alumina molar ratios, e.g., mixtures of zeolites X and Y. U.S. Pat. No. 3,748,251 to Demmel et al., discloses a catalyst composition comprising two cracking components, one of which is a ZSM-5-type zeolite. Finally, U.S. Pat. No. 3,847,793 to Schwartz et al., discloses a two-stage combination cracking operation which relies upon a combination of catalyst functions and a dual cracking component catalyst comprising a ZSM-5-type of crystalline aluminosilicate composition.

The recent impetus for eliminating octane-improving additives, such as lead and manganese from commercial gasoline, has increased the importance of improving the clear octane of the various components which make up the gasoline pool. Catalytically cracked naphtha is an important source of gasoline in the United States, but is often among the lower-octane components employed in the unleaded gasoline pool. It is often necessary to upgrade FCC-derived naphtha by any of the several conventional refining operations, such as reforming or alkylation, but the added expense of further refining can be avoided if the octane ratings of FCC naphtha can be raised to an acceptable level by modifying the catalytic cracking operation itself. The practice of the present invention results in an unexpected increase in the amount of gasoline produced in a conventional FCC operation without the necessity for alkylation. Further, the practice of the present invention produces a higher octane gasoline with increased aromatics content.

SUMMARY OF THE INVENTION

The present invention relates to a process for catalytically cracking a hydrocarbonaceous feedstock, preferably in a single stage, in which the feedstock is contacted in a reaction zone under catalytic cracking conditions in the absence of added hydrogen with a dual component catalyst composition. One component of the catalyst is an essentially alumina-free crystalline silicate. The other component of the catalyst is a large pore size crystalline aluminosilicate cracking component.

DESCRIPTION OF THE PREFERRED EMBODIMENTS

The present invention is employed in a system for catalytically cracking hydrocarbonaceous feeds. Conventional catalytic cracking feeds typically include a mixture of aliphatic and aromatic hydrocarbons boiling at 221° C. and higher. The same hydrocarbonaceous feeds normally processed in commercial catalytic cracking systems may be processed in a cracking system employing the present invention. Suitable feedstocks include, for example, petroleum distillates or residuals, either virgin or partially refined, e.g., by catalytic hydroprocessing. Thus, conventional gas oil cuts are suitable, as are atmospheric and vacuum residua. So-called synthetic feeds, such as coal oils, bitumen and shale oils, are also suitable. A suitable feed may also include recycled hydrocarbons which have already been subjected to cracking, for example, light, medium and heavy cycle oils.

The cracking conditions employed in accordance with the present invention, may be obtained in part by preheating or heat-exchanging the hydrocarbonaceous feed to bring it to a temperature of about 315° C.–400° C. before introducing it into the cracking zone, but preheating of the feed is not essential. Cracking conditions typically include a temperature of from about 425° C. to about 650° C., preferably 500° C. to 540° C. Cracking conditions also include a pressure in the range from about 0 to about 6 atmospheres, preferably from about 1.5 to about 4 atmospheres. In fluidized catalyst systems, a catalyst-hydrocarbon weight ratio of from about 2 to 15 is usually suitable. The cracking, or reaction, zone may be of conventional design and may use dilute-phase fluidized catalyst contact, riser-type entrained catalyst contact, dense-bed fluidized catalyst contact, countercurrent contact, or a combination thereof, between the feed hydrocarbons and the catalyst. The present invention may also be carried out employing a fixed bed or moving bed, although riser cracking is particularly preferred. In a riser cracking operation, residence or contact times of from about 0.3 to 10 seconds are generally employed, although times of from about 0.3 to 3 seconds are preferred.

The catalyst composition in accordance with the present invention generally includes two components. The first component is an essentially alumina-free crystalline silicate having a pore size which will allow the entry into its internal pore structure of normal aliphatic compounds and slightly branched aliphatic compounds, particularly monomethyl substituted compounds, yet substantially exclude all compounds containing at least a quaternary carbon atom or having a molecular dimension equal to or substantially greater than a quaternary carbon atom.

An essentially alumina-free crystalline silicate that may be employed in accordance with the present invention is the crystalline silica polymorph called "silicalite", although the terminology "crystalline silicate" is employed herein to designate an essentially alumina-free crystalline silicate component in accordance with the present invention.

The terminology crystalline silicate as employed herein refers to silicates having a rigid, three-dimensional network of $SiO_4$ tetrahedra which are cross-linked by shared oxygen atoms. Crystalline silicates are essentially alumina-free, but often contain minor amounts of alumina because of impure starting materials or reaction vessel contamination. The silica-alumina mole ratio of the crystalline silicates useful in accordance with the present invention is greater than about 300:1, preferably greater than about 500:1 and most preferably greater than about 1000:1 or 2000:1. Typical crystalline silicates in the calcined form have specific gravities of from about 1.50 to about 2.10 g/cc and a refractive index of about 1.3 to about 1.5.

Certain crystalline silicates which are useful in a process in accordance with the present invention have been prepared. Silicalite (U.S. Pat. No. 4,061,724) has, as synthesized, a specific gravity at 25° C. of 1.99±0.05 g/cc and a near refractive index of 1.48±0.01. In the calcined form (600° C. in air for one hour), silicalite has a specific gravity of 1.70±0.05 g/cc and a refractive index of 1.39±0.01.

The X-ray powder diffraction pattern of the calcined form of silicalite exhibits the six strongest lines (i.e., interplanar spacings) set forth in Table A ("s"—strong, and "vs"—very strong):

TABLE A

| d-A | Relative Intensity |
|---|---|
| 11.1 ± 0.2 | vs |
| 10.0 ± 0.2 | vs |
| 3.85 ± 0.07 | vs |
| 3.82 ± 0.07 | s |
| 3.76 ± 0.05 | s |
| 3.72 ± 0.05 | s |

Table B shows the X-ray powder diffraction pattern of a typical silicalite composition containing 51.9 moles of $SiO_2$ per mole of $(TPA)_2O$, prepared according to the method disclosed in U.S. Pat. No. 4,061,724, and calcined in air at 600° C. for one hour.

TABLE B

| d-A | Relative Intensity | d-A | Relative Intensity |
|---|---|---|---|
| 11.1 | 100 | 4.35 | 5 |
| 10.02 | 64 | 4.25 | 7 |
| 9.73 | 16 | 4.08 | 3 |
| 8.99 | 1 | 4.00 | .3 |
| 8.04 | 0.5 | 3.85 | 59 |
| 7.42 | 1 | 3.82 | 32 |
| 7.06 | 0.5 | 3.74 | 24 |
| 6.68 | 5 | 3.71 | 27 |
| 6.35 | 9 | 3.64 | 12 |
| 5.98 | 14 | 3.59 | 0.5 |
| 5.70 | 7 | 3.48 | 3 |
| 5.57 | 8 | 3.44 | 5 |
| 5.36 | 2 | 3.34 | 11 |
| 5.11 | 2 | 3.30 | 7 |
| 5.01 | 4 | 3.25 | 3 |
| 4.98 | 5 | 3.17 | 0.5 |
| 4.86 | 0.5 | 3.13 | 0.5 |
| 4.60 | 3 | 3.05 | 5 |
| 4.44 | 0.5 | 2.98 | 10 |

Crystals of silicalite in both the synthesized and calcined form are orthorhombic and have the following unit cell parameters: a=20.05 A, b=19.86 A, c=13.36 A (all values ±0.1 A).

Silicalite has a pore diameter of about 6 Angstroms and a pore volume of about 0.18 cc/gram as determined by adsorption. At room temperature, silicalite adsorbs neopentane (6.2 A kinetic diameter) slowly. Its uniform pore structure provides size-selective molecular sieve properties, and its pore size permits the separation of p-xylene from o-xylene, m-xylene and ethylbenzene as well as the separation of compounds having quaternary carbon atoms from those having carbon-to-carbon linkages of lower value (e.g., normal and slightly branched paraffins).

The crystalline silicates disclosed in U.S. Pat. No. Re. 29,948 have a composition, in the anhydrous state:

$$0.9\pm0.2[xR_2O+(1-x)\ M_{2/n}O]:<0.005Al_2O_3:>1-SiO_2$$

where M is a metal other than a metal of Group IIIA, n is the metal's valence, R is an alkyl ammonium radical and x is a number greater than 0 but not exceeding 1. The organosilicate is characterized by the X-ray diffraction pattern of Table C.

TABLE C

| Interplanar spacing d(a): | Relative Intensity |
|---|---|
| 11.1 | s |
| 10.0 | s |
| 7.4 | w |
| 7.1 | w |
| 6.3 | w |
| 6.04 | w |
| 5.97 | w |
| 5.56 | w |
| 5.01 | w |
| 4.60 | w |
| 4.25 | w |
| 3.85 | vs |
| 3.71 | s |
| 3.04 | w |
| 2.99 | w |
| 2.94 | w |

The crystalline silicate polymorph disclosed in U.S. Pat. No. 4,073,865 has a specific gravity of $1.70\pm0.05$ g/cc. and a mean refractive index of $1.39\pm0.01$ after calcination in air at 600° C. and is prepared by a hydrothermal process involving fluoride anions. The silicate crystals, which can be as large as 200 microns, exhibit both a substantial absence of infrared adsorption in the hydroxyl-stretching region and an exceptionally high degree of hydrophobicity. They exhibit the X-ray diffraction pattern of Table D.

TABLE D

| d(A) | Intensity |
|---|---|
| 11.14 | 91 |
| 10.01 | 100 |
| 9.75 | 17 |
| 8.99 | 1 |
| 8.04 | 0.5 |
| 7.44 | 0.5 |
| 7.08 | 0.2 |
| 6.69 | 4 |
| 6.36 | 6 |
| 5.99 | 10 |
| 5.71 | 5 |
| 5.57 | 5 |
| 5.37 | 1 |
| 5.33 | 1 |
| 5.21 | 0.3 |
| 5.12 | 1.5 |
| 5.02 | 3 |
| 4.97 | 6 |
| 4.92 | 0.6 |
| 4.72 | 0.5 |
| 4.62 | 2 |
| 4.47 | 0.6 |
| 4.36 | 3 |
| 4.25 | 4 |
| 4.13 | 0.5 |
| 4.08 | 1.5 |
| 4.00 | 3 |
| 3.85 | 44 |
| 3.82 | 25 |
| 3.71 | 21 |
| 3.65 | 5 |
| 3.62 | 5 |
| 3.59 | 1 |

TABLE D-continued

| d(A) | Intensity |
|---|---|
| 3.48 | 1.5 |
| 3.45 | 3 |
| 3.44 | 3 |
| 3.35 | 3 |
| 3.31 | 5 |
| 3.25 | 1.5 |
| 3.23 | 0.8 |
| 3.22 | 0.5 |

The following method for the preparation of the crystalline silicate called "silicalite-2" was reported by Bibby et al in Nature, 280, 664-665 (1979).

The silicalite-2 precursor may be prepared using only tetra-n-butylammonium hydroxide, although adding ammonium hydroxide or hydrazine hydrate as a source of extra hydroxyl ions increases the reaction rate considerably. A successful preparation is to mix 8.5 mol $SiO_2$ as silicic acid (74% $SiO_2$), 1.0 mole tetra-n-butylammonium hydroxide, 3.0 mole $NH_4OH$ and 100 mole water in a steel bomb and heat at 170° C. for 3 days.

Crystalline silicates are generally prepared by hydrothermal crystallization of a reaction mixture comprising water, a source of silica and an organic templating compound at a pH of from about 10 to 14. Representative templating moieties include quaternary cations such as $XR_4$, wherein X is phosphorous or nitrogen and R is an alkyl radical containing from 2 to 6 carbon atoms, e.g., tetrapropyl ammonium hydroxide or halide, as well as alkyl hydroxyalkyl compounds, organic amines and diamines, and heterocycles such as pyrrolidone.

When the organic templating compound is present in the hydroxide form in sufficient quantity to produce a basicity equivalent to a pH of from 10 to 14, the reaction mixture need additionally contain only water and a reactive form of silica. Otherwise, ammonium hydroxide or an alkali metal hydroxide, particularly the hydroxides of lithium, sodium or potassium, may be added. Apparently, not more than 6.5 moles of alkali metal oxide per mole-ion of organic templating species are required even if the hydroxide form of templating compound is completely absent.

An alkali metal silicate is a suitable source of silica for preparing a crystalline silicate and should be employed in an amount so as to adversely affect the molar ratio of alkali metal to organic templating compound. Other silica sources include solid reactive amorphous silica, e.g., fume silica, silica sols, silica gel, and organic orthosilicates. Since alumina is readily incorporated as an impurity in the crystalline silica product, the silica source should be selected carefully to minimize the potential alumina impurity content. Commercially available silica sols typically contain from 100 to 700 ppm $Al_2O_3$, and fume silicas may contain from 80 to 2000 ppm of $Al_2O_3$ impurity. Ethyl orthosilicate is preferred because of its potential very low aluminum content.

The reaction mixture should generally contain from about 3 to 50 moles of $SiO_2$ and from about 100 to 700 moles of water per mole-ion of the organic templating compound. The reaction is preferably conducted in an aluminum free reaction vessel, which is resistant to alkali or base attack, e.g., teflon.

When alkali metal hydroxides are used in the reaction mixture for the formation of crystalline silicates, alkali metal cations appear as impurities in the crystalline product. Silicalite, as defined in U.S. Pat. No. 4,061,724, is high in sodium, i.e., contains greater than 1% of sodium and, therefore, does not give much conversion in the short residence times employed in modern fluid catalytic cracking units. The concentration of alkali metal moieties in the crystalline silicate mass should be reduced by ion exchange or other suitable removal techniques to less than about 0.1 weight percent, preferably less than 0.03 weight percent and most preferably less than 0.01 weight percent.

Suitable ion exchange materials include those which are decomposable to hydrogen by calcination as are known in the art, for example, ammonium nitrate, as well as metal cations such as calcium, strontium, barium, zinc, silver, or the rare earth metals.

The residual alkali metal in the product can also be removed by washing with an aqueous acid solution of sufficient strength, e.g., hydrochloric acid. The crystal structure is not otherwise affected by contact with strong mineral acids even at elevated temperatures due to the lack of acid-soluble constituents in its crystal structure.

In addition to a crystalline silicate, the present invention employs a large pore crystalline aluminosilicate cracking component which may comprise any of the crystalline aluminosilicates which are suitable for cracking hydrocarbons and which provide a pore size in excess of about 7 Angstroms. Such a cracking component has the structure and capability to act upon substantially all the components usually found in a gas oil feed boiling in the range of from about 250°–600° C. Large pore zeolites of this type are well known and include naturally occuring materials or synthetic faujasite of both the X and Y type as well as zeolite L. Of these materials, zeolite Y is preferred. Particularly preferred are the rare earth exchanged Y-type zeolites and, most particularly, ultrastable Y.

Generally speaking, the large pore cracking component can comprise any porous cracking component such as silica/alumina and, particularly, a crystalline aluminosilicate zeolite component having uniform pore dimensions and a pore size from about 7 to 15 Angstroms. As noted above, the large pore zeolite components admit both normal and iso-aliphatics and, therefore, are capable of acting with respect to the entirety of the hydrocarbonaceous feed.

In a preferred embodiment, the large pore crystalline aluminosilicate cracking component is a crystalline aluminosilicate zeolite which is commonly known as an "ultra-stable" faujasite or Y-type zeolite. These ultra-stable zeolites are well known and conventionally used in various conversion processes. They are described, for example, in U.S. Pat. Nos. 3,293,192 and 3,402,996, which are incorporated by reference herein.

In general, "ultra-stable" refers to a Y-type zeolite which is highly resistant to degradation of crystallinity by high temperatures and steam treatment and is characterized by an $R_2O$ content (where R is an alkali metal) of less than 1 weight percent and a unit cell size less than 24.60 Angstroms (usually in the range of 24.2 to 24.50 Angstroms) and an $SiO_2/Al_2O_3$ mole ratio in the range of 3.5–7 or higher. The ultra-stable form of the Y-type zeolite is obtained by the virtual elimination of the alkali metal ion and is identified both by a smaller unit cell and a lack of alkali metal in the crystal structure.

As is generally known, the ultra-stable form of the Y-type zeolite can be prepared by successively base-exchanging a Y-type zeolite with an aqueous solution of an ammonium salt, such as ammonium nitrate, until the alkali metal content of the Y-type zeolite is reduced to less than about 5 weight percent. The base-exchanged zeolite is then calcined in a steam-containing atmosphere at a temperature of from about 540° C. to 760° C. for several hours, cooled and thereafter again successively base-exchanged with an aqueous solution of an ammonium salt until the alkali metal content is reduced to less than 1 weight percent. This is followed by washing and calcining again at a temperature of 425° C. to 760° C. to produce the ultra-stable zeolite Y. As previously noted, this sequence results in the virtual elimination of the alkali metal content of the original zeolite and unit cell shrinkage.

For use in catalytic cracking, it is often desirable to reduce the initial alkali metal content of any of the crystalline aluminosilicate zeolites by replacing their alkali metal content with other metals or hydrogen-containing components. Typically, the alkali metal content is reduced to less than 10 weight percent, preferably less than 4 weight percent and most preferably less than 2 weight percent. Such alkali metal content reduction is readily accomplished by well known techniques, e.g., ion-exchange. Desirable cations for exchange include calcium, magnesium, ammonium, manganese, lanthanum, cerium, and mixtures of the rare earth metals, etc.

The rare earth metal content of the zeolite is generally from 0 to 22, preferably 14 to 22, weight percent as oxides based on the weight of the rare earth metal-containing zeolite.

A wide variety of rare earth compounds can be employed as the source of rare earth ions, for example, rare earth chlorides, bromides, iodides, nitrates, acetates, sulfates, formates, and the like. The particular rare earth metal salt or salts employed should, of course, be sufficiently soluble in its fluid medium to provide the requisite rare earth ion transfer. Preferred rare earth metal salts are the chlorides, nitrates, and sulfates. Representative rare earth metals are cerium, lanthanum, praseodymium, neodymium, promethium, samarium, europium, gadolinium, terbium, dysprosium, holmium, erbium, yttrium, thulium, scandium, and lutecium. The salt employed may be the salt of either a single rare earth metal or a mixture of rare earth metals.

As with other exchangeable metal ions, the rare earth metal is preferably incorporated into the crystalline aluminosilicate by ion exchange methods as known in the art. In one such method, an alkali metal crystalline aluminosilicate is base exchanged by contacting with a 5–10% (wt.) rare earth chloride solution at 54° C.–88° C. for 2–24 hours, filtering, drying and calcining at about 400° C.–650° C. for 0.5–2.0 hours in ambient air. The process may, of course, be repeated to achieve higher levels of exchange. Other methods for incorporating one or more rare earth metals into a zeolite are set forth in U.S. Pat. Nos. 3,823,092; 3,609,103; and 3,436,357, which are incorporated by reference herein.

In accordance with the present invention, the dual cracking component catalyst may comprise a physical mixture of separate particles of the two catalyst components, each particle containing a single component. The use of separate particles of different pore sizes may facilitate the optimization of the catalytic cracking process by permitting relatively rapid changes in the ratio of the crystalline silicate component and the large pore size crystalline aluminosilicate cracking component.

The particular proportions of the two components in this system can vary over an extremely wide range, and it has been found that the weight ratio of the crystalline silicate component to the large pore size crystalline aluminosilicate cracking component can be from about 1:20 to 3:1, preferably from about 1:10 to 2:1.

As noted above, the composite catalyst in accordance with the present invention may comprise a physical mixture of two catalyst components. In another embodiment, a mixture of catalyst particles may be used in which each particle contains only one of the two components. In still another embodiment, the catalyst components may be composited in an inorganic matrix, e.g., pelleted, cast, molded, spray-dried, or otherwise formed into pieces of desired size and shape such as rods, spheres, pellets, etc.

Inorganic porous oxides which may be used as the matrix for compositing the two components of the present catalyst composition include any of the readily available porous materials such as alumina, boria, silica, chromia, magnesia, zirconia, titania, the like, and their mixtures. These materials may also include one or more of the various well known clays such as montmorillonite, kaolin, halloysite, bentonite, attapulgite, and the like. Preferably, the inorganic porous oxide comprises one or more of the conventional siliceous varieties containing a major amount of silica and a minor amount of an oxide of at least one metal in Groups II-A, III-A and IV-B of the Periodic Table (Handbook of Chemistry and Physics, 38th Ed., 1957). Representative materials include silica-alumina, silica-magnesia, silica-zirconia, silica-thoria, silica-titania, silica-alumina-zirconia, magnesia, etc. The most preferred inorganic porous oxide matrix material, however, is silica-alumina.

As is generally known, these matrix or compositing materials are typically prepared from silica hydrogel or hydrosol, which is mixed with alumina to obtain the desired silica-alumina composition. The alumina content is typically from about 5 to 40 weight percent, preferably about 10 to 35 weight percent. various procedures are described in the literature for making silica-alumina, e.g., U.S. Pat. Nos. 2,908,635 and 2,844,523. Where an inorganic matrix is utilized, the total amount of catalytic material (of the two or more types) is generally from about 10 to 65 weight percent, preferably 15 to 50 weight percent and most preferably 20 to 40 weight percent based on the total composition.

EXAMPLE I

Pulse decane cracking tests were conducted over a ZSM-5-type catalyst component at 482° C. and 510° C. The results as set forth in Tables I and II demonstrate that as the aluminum content of a ZSM-5-type catalyst component decreases, its selectivity for producing $C_5+$ increases. The increase is unexpectedly dramatic at the higher silica-alumina ratios. In addition, the aromatic content of the $C_5+$ fraction was surprisingly high, especially at the higher silica-alumina ratios.

TABLE I

Pulse Decane Cracking Over ZSM-5-Type Catalyst Component at 510° C. (Sieve Steamed 6 Hrs. at 760° C.)

| Sieve Al, % | 0.04 | 0.45 | 2.3 | 2.3 |
|---|---|---|---|---|
| $SiO_2/Al_2O_3$ | 2200 | 200 | 39 | 39 |
| Conversion, Wt. % | 7 | 12 | 34 | 12 |
| Selectivity | | | | |
| $C_2-C_3$ | 28 | 35 | 42 | 39 |
| $C_4$ | 28 | 33 | 29 | 31 |
| $C_5-C_9$ | 44 | 32 | 29 | 30 |
| Aromatics Contents in $C_5-C_9$, wt. % | 30 | 24 | 18 | 14 |

TABLE II

Pulse Decane Cracking Over ZSM-5-Type Catalyst Component at 482° C. (Sieve Steamed 6 Hrs. at 760° C.)

| Sieve Al, % | 0.04 | 0.45 | 2.3 | 2.3 |
|---|---|---|---|---|
| $SiO_2/Al_2O_3$ | 2200 | 200 | 39 | 39 |
| Conversion, Wt. % | 6 | 7 | 21 | 7 |
| Selectivity | | | | |
| $C_2-C_3$ | 0 | 39 | 40 | 39 |
| $C_4$ | 65 | 32 | 36 | 31 |
| $C_5-C_9$ | 35 | 29 | 24 | 30 |
| Aromatics Content in $C_5-C_9$, wt. % | 29 | 23 | 15 | 12 |

The pulse decane cracking test procedure was as follows: 0.1-0.5 g of catalyst were mixed with 1 g of acid-washed and neutralized alundum and packed in a 3/16" stainless steel reactor tube with the remaining space filled with alundum. The reactor contents were calcined for one hour at 450° C. The reactor was then placed in a clam-shell furnace and the reactor outlet connected to the inlet of a gas chromatrograph. The inlet was connected to the carrier gas line of the GC. Helium was passed through the system at 30 cc/min. 0.04 Microliter pulses of n-decane were injected through a septum above the reactor and reaction products were determined by standard GC analysis. Blank runs with alundum showed no conversion under the experimental conditions, nor did a 100% Catapal alumina catalyst.

EXAMPLE II

When a standard ZSM-5-type catalyst having a silica-alumina ratio of about 80 was added to a large pore size cracking catalyst, volume percent gasoline decreased. Selectivity to $C_3-C_4$ olefin increased, however, so more gasoline could be produced by alkylation. The octane rating also increased for both light and heavy gasoline. This is shown in Table III and comports with the results reported by Rosinski et al in U.S. Pat. No. 3,758,403.

As also can be seen from Table III, the extra gasoline production required the addition of at least 10.1 bbl of isobutane for every 100 bbl of feed for alkylation, whereas use of the standard large pore size cracking component alone required 6.3 bbl at most.

The cracking catalyst of Table III was an equilibrium commercial FCC catalyst containing about 20% large pore size zeolite. The feed employed was a 224° C.-464° C. boiling range light East Texas gas oil (LETGO) with a 5% point of 249° C. and a 95% point of 407° C. and having a specific gravity of 35.8, and the cracking conditions included a temperature of 496° C., a catalyst to oil ratio of 2 and a fixed fluidized bed. The reported results are an average of four cycles.

TABLE III

|  | Cracking Catalyst[1] | Cracking Catalyst[1] +5% HZSM-5 | Cracking Catalyst[2] | Cracking Catalyst[2] +5% HZSM-5 | Cracking Catalyst[3] | Cracking Catalyst[3] +5% HZSM-5 |
|---|---|---|---|---|---|---|
| Conversion, LV % | 45.7 | 57.5 | 43.1 | 52.8 | 39.4 | 43.6 |
| Yields, LV % |  |  |  |  |  |  |
| $C_3$-$C_4$ P | 4.8 | 18.1 | 3.9 | 6.6 | 2.7 | 3.9 |
| $C_3$-$C_4$ E | 7.8 | 24.2 | 7.1 | 17.2 | 5.6 | 10.4 |
| $C_5$-250° F. | 20.3 | 13.5 | 21.9 | 21.2 | 18.4 | 19.9 |
| 250–430° F. | 18.9 | 12.5 | 16.5 | 17.4 | 17.8 | 16.2 |
| FCC Gasoline | 39.2 | 26.0 | 38.4 | 38.6 | 36.2 | 36.1 |
| FCC Gasoline and Alkylate | 52.5 | 67.1 | 50.6 | 68.1 | 45.8 | 53.8 |
| Outside $iC_4$ | 6.3 | 21.5 | 6.1 | 16.7 | 5.0 | 10.1 |
| Octanes (F-1/F-2) |  |  |  |  |  |  |
| $C_5$-250° F. | 91.4/79.2 | 93.0/79.8 | 91/79 | 92/79 | ~91/~79 | 93.6/80.0 |
| 250–430° F. | 85.2/76.5 | 97.0/84.6 | 85.2/76.8 | 88.9/77.9 | 83.5/76.4 | 87.7/77.9 |

[1] Calcined 4 hrs. at 590° C.
[2] Steamed 6 hrs. at 650° C.
[3] Steamed 30 hrs. at 650° C.

EXAMPLE III

In accordance with the present invention, as demonstrated by Tables IV and V, the use of an essentially alumina-free crystalline silicate component in conjunction with a large pore size crystalline aluminosilicate cracking catalyst unexpectedly increased not only the yield of gasoline but also its aromatic content without the necessity for alkylation and its accompanying addition of outside isobutane.

Tables IV and V include the results of tests conducted with the above-described LETGO feed under the same cracking conditions including a temperature of 496° C., a catalyst to oil ratio of 2 and a fixed fluidized bed. Again, the reported results are the average of four cycles except for the octane data in Table IV which represent the average of eight samples.

TABLE IV

| CATALYST (Steamed for 6 hrs. at 760° C.) | $SiO_2/Al_2O_3$ of Small Pore Size Component | LV Conversion % | LV % Gasoline $C_5$-221° C. | Octane F-1 Clear |
|---|---|---|---|---|
| (A) 20% REY + Durabead Matrix | — | 80.8 | 57.1 | 88.7 |
| (B) 20% REY + Durabead Matrix + 3% Crystalline silicate (silicalite) | ~650 | 80.7 | 57.9 | 89.3 |

TABLE V

| CATALYST (Steamed for 6 hrs. at 760° C.) | $SiO_2/Al_2O_3$ of Small Pore Size Component | LV Conversion % | LV % $C_4=$ | LV % $C_3=$ | LV % Gasoline $C_5$-221° C. |
|---|---|---|---|---|---|
| (C) 20% REY + Synthetic Matrix | — | 47.4 | 2.4 | 4.2 | 37.1 |
| (D) 20% REY + Synthetic Matrix + 9% crystalline silicate (silicalite) | ~650 | 50.6 | 2.0 | 3.2 | 41.0 |
| (E) 20% REY + Synthetic Matrix 9% ZSM-5 | ~75 | 49.6 | 3.0 | 5.0 | 39.6 |

Catalyst (A) was prepared by peptizing 20 weight percent total solids catapal alumina with nitric acid. To this 60 weight percent of solids of amorphous, calcined silica-alumina (Durabead) was added. The resulting mixture was neutralized (to pH 4.5–6) with concentrated NH₄OH and then 20 weight percent of solids REY zeolite was added. The resulting slurry was spray dried prior to testing.

Catalyst (B) was prepared like Catalyst (A) except that 3 weight percent of the silica-alumina was replaced with 3 weight percent of the silicalite. The slurry was also spray dried prior to testing.

Catalyst (C) was similarly prepared by spray drying a slurry composed of 80 weight percent (of solids) silica-alumina gel and 20 weight percent REY (rare earth exchanged Y-type) zeolite. The dried material was repeatedly washed with ammonium hydroxide, then water and finally air dried at 200° F. For Catalysts (D) and (E) the silicalite or HZSM-5 was added to the slurry prior to spray drying.

A comparison of the results obtained with Catalysts (A) and (B) demonstrates the unexpected increase in gasoline yield and octane number upon addition of only 3 weight percent silicalite.

A comparison of the results obtained employing catalysts (C) and (D) confirm the pulse decane cracking results set forth in Tables I and II. In other words, the addition to an FCC catalyst containing a large pore size crystalline aluminosilicate cracking component of an essentially alumina-free ZSM-5-type crystalline silicate component (silicalite) unexpectedly produced a higher yield of gasoline. These results are especially surprising, since one would reasonably expect silicalite to crack the normal paraffins out of gasoline to give a higher octane but with a lower yield.

A comparison of the results obtained with catalysts (D) and (E) demonstrates the advantage of the present catalyst composition in a catalytic cracking process over a similar composition employing ZSM-5-type catalyst having a low silica-alumina ratio.

Although the present invention has been described with reference to particular preferred embodiments, it should be understood that obvious modifications will suggest themselves to those of ordinary skill in the art. It is, therefore, the intent that the present invention not be limited by the specific examples but only as defined in the following claims.

What is claimed is:

1. A process for catalytically cracking a hydrocarbonaceous feedstock comprising the step of contacting the feedstock in a reaction zone under catalytic cracking conditions in the absence of added hydrogen with a catalyst composition comprising a crystalline silicate component having a mole ratio of oxides of $SiO_2:Al_2O_3$ greater than about 500 and having an internal pore structure which will allow the entry of normal aliphatic and slightly branched aliphatic compounds, yet substantially exclude all compounds having a molecular dimension equal to or substantially greater than a quaternary carbon atom and a large pore size crystalline aluminosilicate cracking component.

2. The process of claim 1, wherein the crystalline silicate component has a sodium content of less than about 1 weight percent.

3. The process of claim 1, wherein the mole ratio of oxides $SiO_2:Al_2O_3$ is greater than about 1000.

4. The process of claim 1, wherein the crystalline silicate has the characteristic random powder X-ray diffraction lines of Table A.

5. The process of claim 1, wherein the crystalline silicate has the characteristic random powder X-ray diffraction lines of Table C.

6. The process of claim 1, wherein the large pore size crystalline aluminosilicate cracking component is a Y-type zeolite.

7. The process of claim 1, wherein the large pore size crystalline aluminosilicate cracking component is an REY zeolite.

8. The process of claim 1, wherein the large pore size crystalline aluminosilicate cracking component is ultrastable Y.

9. The process of claim 1, wherein the catalytic cracking conditions include a temperature of from about 425° C. to 650° C., a pressure of from about 0 to 6 atmospheres, a catalyst-hydrocarbon weight ratio of from about 2 to 15 and a contact time in the reaction zone of from about 0.3 to 10 seconds.

10. The process of claim 9, wherein the contact time in the reaction zone is from about 0.3 to 3 seconds.

11. The process of claim 1, wherein the contacting step comprises contacting a single feed in a single stage in the reaction zone.

12. The process of claim 1, wherein the catalyst composition comprises a physical mixture of the two components.

13. The process of claim 1, wherein the two catalyst components are incorporated in an inorganic matrix.

14. The process of claim 13, wherein the total weight of the two catalyst components is from about 10 to 65 weight percent of the entire composition.

15. The process of claim 1, wherein the weight ratio of the crystalline silicate component to the crystalline aluminosilicate cracking component is from about 1:20 to 3:1.

16. A process for catalytically cracking a hydrocarbonaceous feedstock in a single stage comprising the step of contacting the feedstock in a reaction zone in the absence of added hydrogen under catalytic cracking conditions including a total residence time in the reaction zone of less than about 10 seconds with a catalyst composition comprising a crystalline silicate component having a mole ratio of oxides $S_1O_2:Al_2O_3$ greater than about 500 and having an internal pore structure which will allow the entry of normal aliphatic and slightly branched aliphatic compounds, yet substantially exclude all compounds having a molecular dimension equal to or substantially greater than a quaternary carbon atom and a large pore size crystalline aluminosilicate cracking component.

17. The process of claim 16, wherein the total residence time in the reaction zone is less than about 3 seconds.

18. The process of claim 16, wherein a single feedstock is contacted in the contacting stage.

19. The process of claim 16, wherein the crystalline silicate component has a sodium content of less than about 1 weight percent.

20. The process of claim 16, wherein the mole ratio of oxides $SiO_2:Al_2O_3$ is greater than about 1000.

* * * * *